Figure 1:
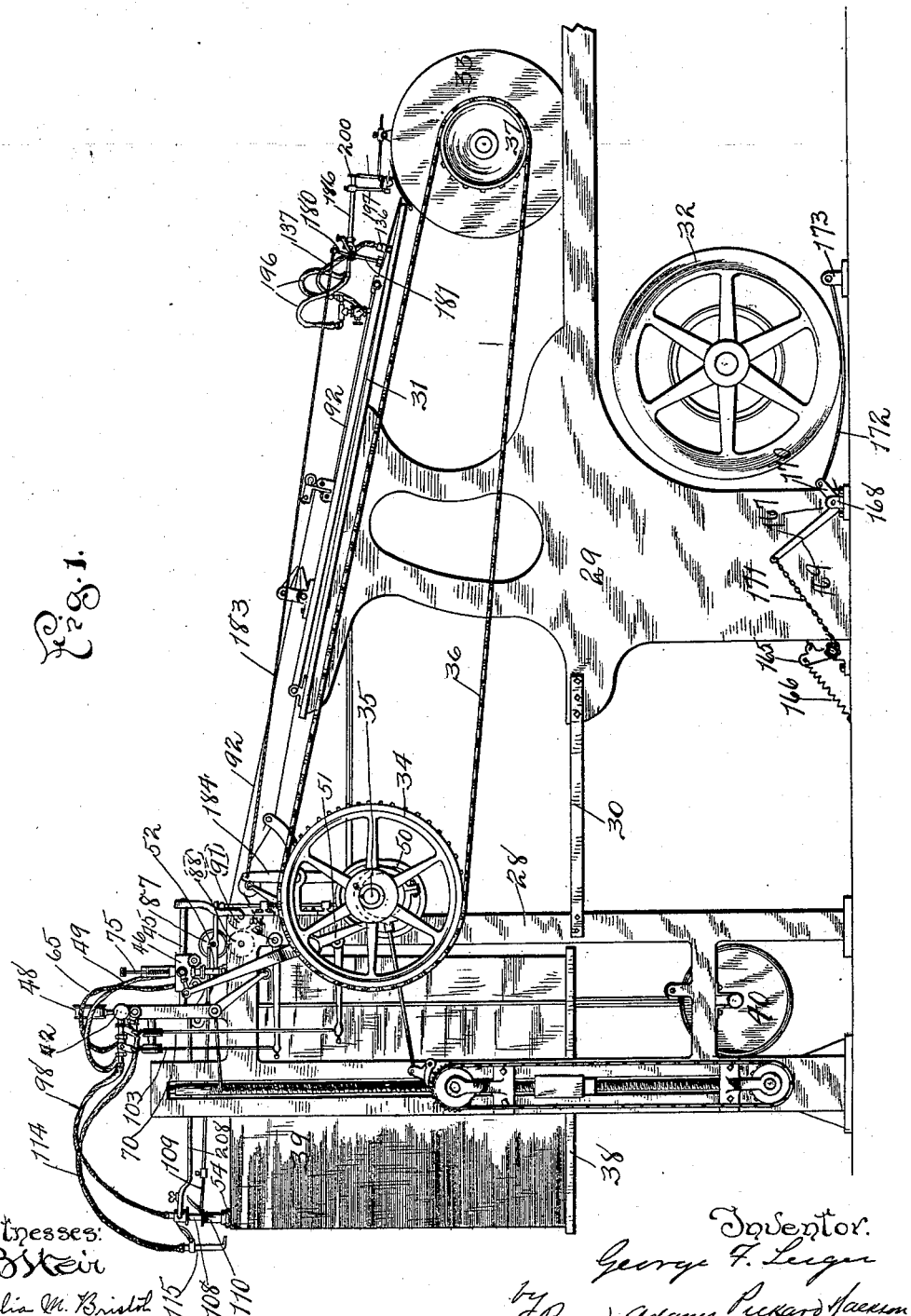

No. 624,228. Patented May 2, 1899.
G. F. LEIGER.
PNEUMATIC SHEET FEEDING MACHINE.
(Application filed Nov. 25, 1898.)
(No Model.) 8 Sheets—Sheet 1.

No. 624,228. Patented May 2, 1899.
G. F. LEIGER.
PNEUMATIC SHEET FEEDING MACHINE.
(Application filed Nov. 25, 1898.)
(No Model.) 8 Sheets—Sheet 3.

Witnesses:
J B Weir
Julia M. Bristol

Inventor.
George F. Leiger
by Bond, Adams, Pickard & Jackson
Attorneys

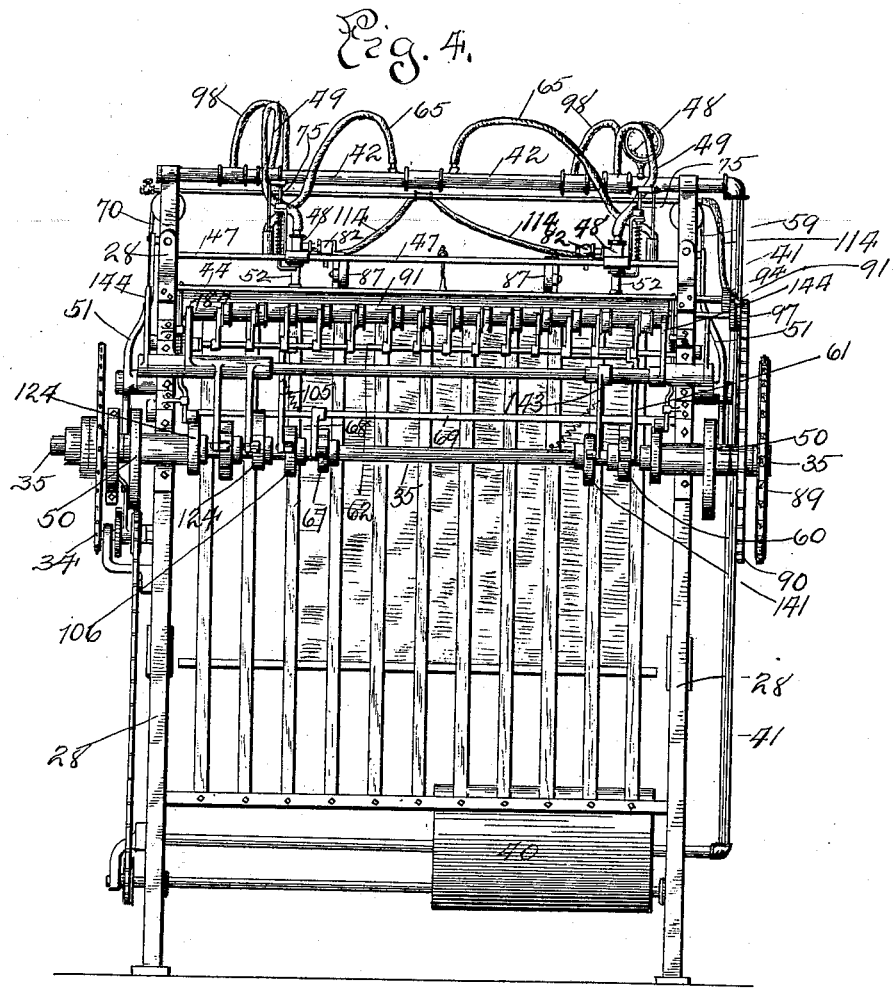

No. 624,228. Patented May 2, 1899.
G. F. LEIGER.
PNEUMATIC SHEET FEEDING MACHINE.
(Application filed Nov. 25, 1898.)
(No Model.) 8 Sheets—Sheet 5.
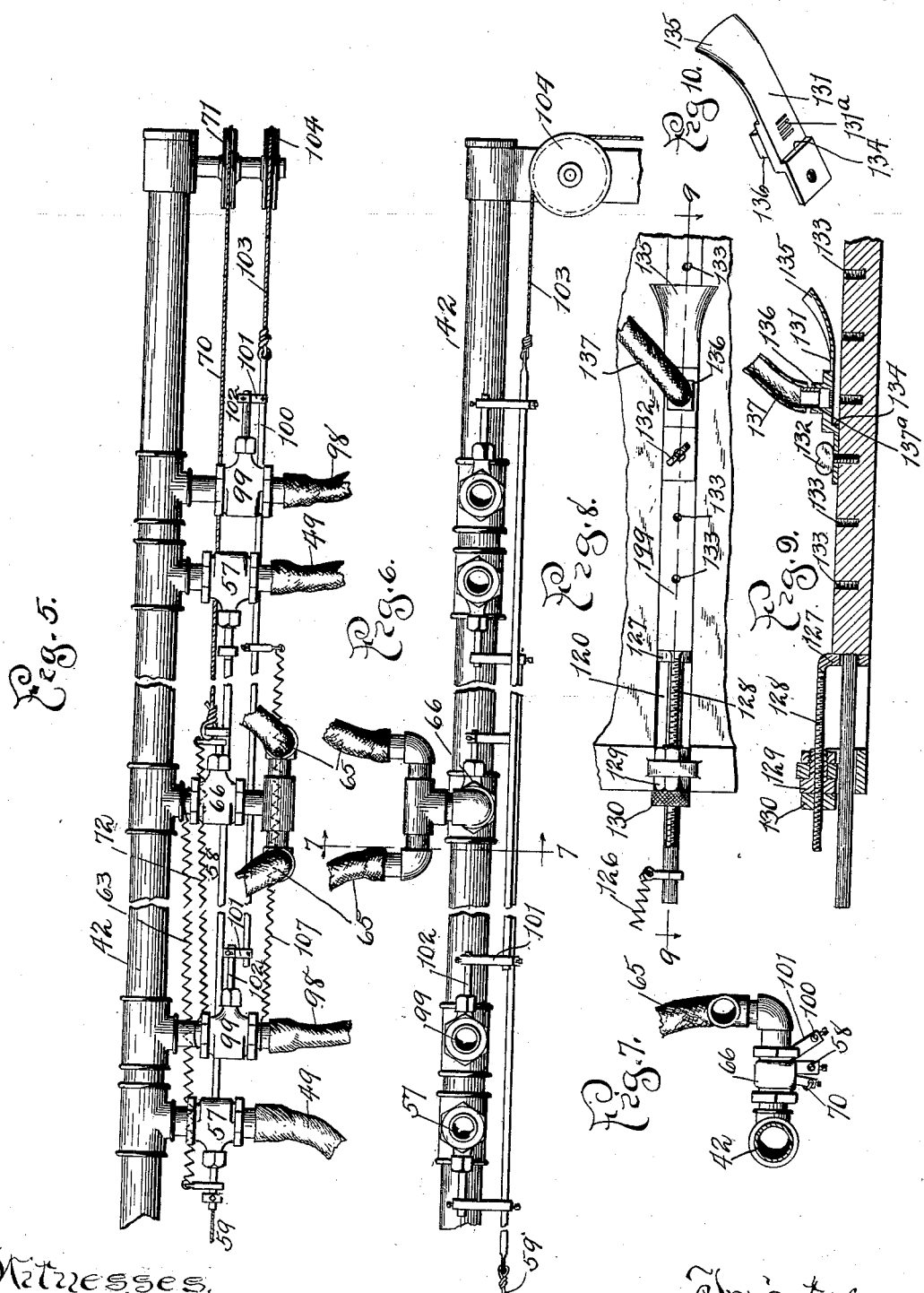
Witnesses.
JB Weir
Julia M. Bristol.
Inventor
George F. Leiger
by Bond, Adams, Pickard & Jackson
Attorneys
THE NORRIS PETERS CO., PHOTO-LITHO., WASHINGTON, D. C.

No. 624,228. Patented May 2, 1899.
G. F. LEIGER.
PNEUMATIC SHEET FEEDING MACHINE.
(Application filed Nov. 25, 1898.)
(No Model.)
8 Sheets—Sheet 6.
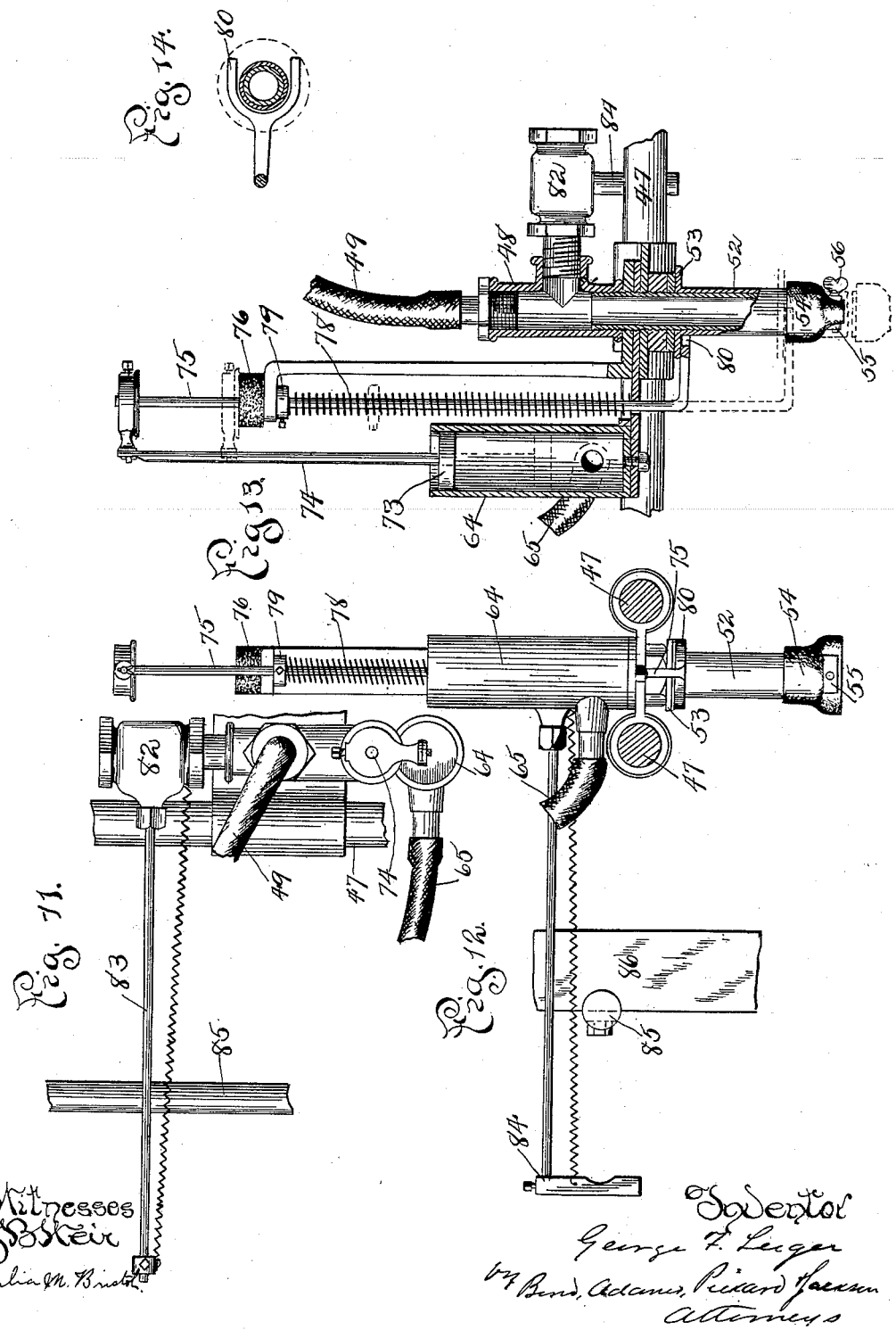

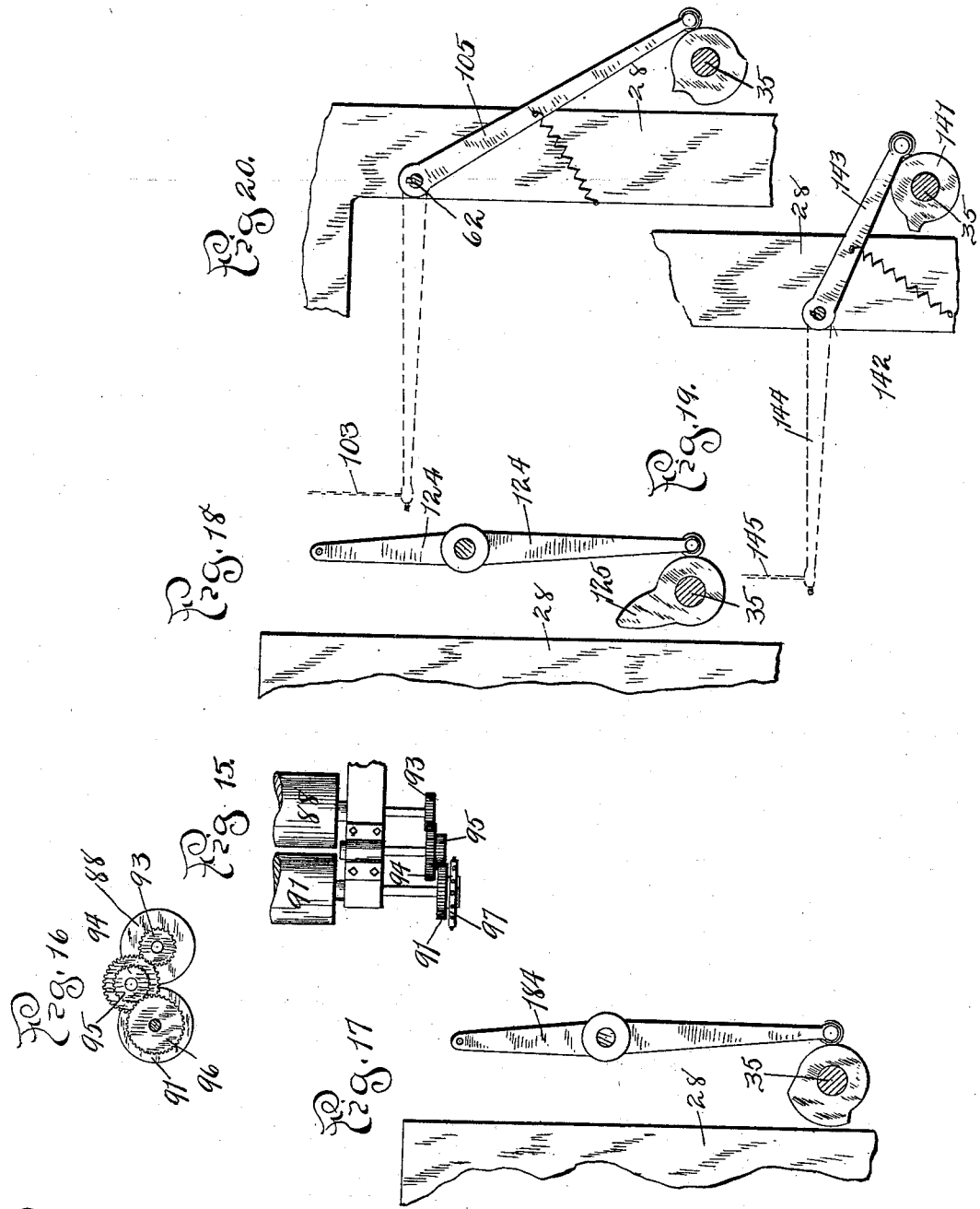

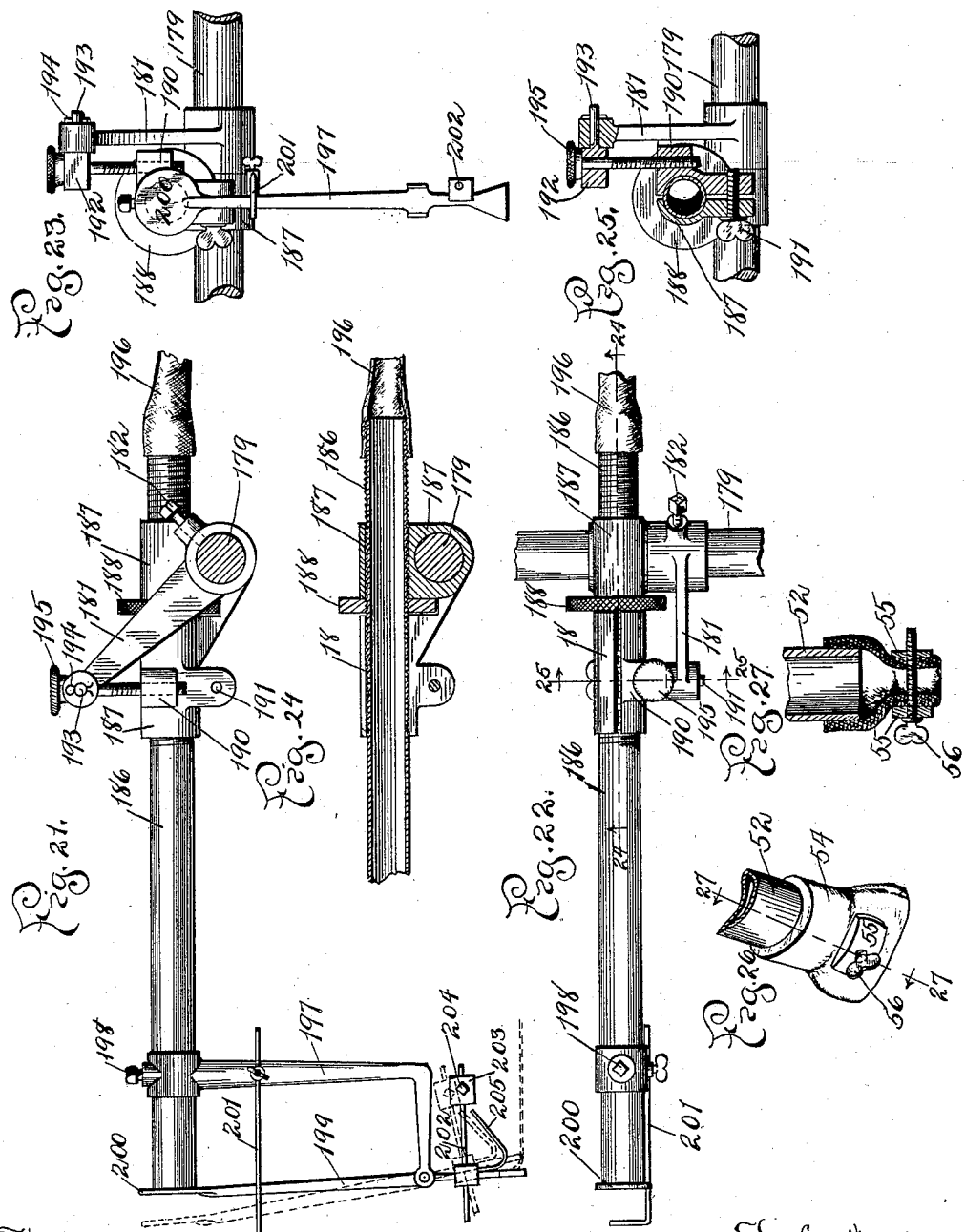

UNITED STATES PATENT OFFICE.

GEORGE F. LEIGER, OF CHICAGO, ILLINOIS, ASSIGNOR TO LEWIS BENEDICT, OF SAME PLACE.

PNEUMATIC SHEET-FEEDING MACHINE.

SPECIFICATION forming part of Letters Patent No. 624,228, dated May 2, 1899.

Application filed November 25, 1898. Serial No. 697,376. (No model.)

*To all whom it may concern:*

Be it known that I, GEORGE F. LEIGER, a citizen of the United States, residing at Chicago, in the county of Cook and State of Illinois, have invented certain new and useful Improvements in Pneumatic Sheet-Feeding Machines, of which the following is a specification, reference being had to the accompanying drawings.

My invention relates to pneumatic sheet-feeding machines of the character shown and described in Letters Patent to me, Nos. 557,279, 583,126, 583,127, 587,383, 607,085, and 659,417; and one of its objects is to improve the mechanisms shown and described in said Letters Patent.

Another object of my invention is to provide a new and improved means by which the feeding forward of only one sheet at a time by the pneumatic pickers may be insured.

Another object of my invention is to provide new and improved means by which the rear end of the top one of a pile of sheets may be lifted preparatory to the feeding forward of the same by the pneumatic pickers engaging the front end thereof in such a way that the raising of only one sheet at a time is positively insured, so that only one sheet may be fed forward by the pneumatic pickers arranged for that purpose.

Another object of my invention is to provide new and improved means by which the telescopic pneumatic pickers by which the sheets are successively fed forward may be positively lifted, carrying the sheet with them, before they begin their forward stroke in order to feed the sheet forward to the forwarding devices.

Another object of my invention is to provide new and improved mechanism by means of which when sheets are fed to the cylinder of a printing-press a correct side register may be accurately made.

Another object of my invention is to provide new and improved mechanism by means of which in case the side register above referred to is not accurately made the power by which the press is driven may be shut off and the press braked.

Another object of my invention is to provide new and improved mechanism by means of which when sheets are fed forward to a printing-press their leading edges may be accurately in position to be seized by the grippers of the printing-press cylinder, and in case through any accident the leading edge of the sheet is not in such position the power by which the press is driven may be automatically shut off and the press automatically brought to a standstill by suitable brake mechanism.

Another object of my invention is to improve the construction and operation of pneumatic sheet-feeding machines in sundry details of construction hereinafter described. I accomplish these objects as hereinafter specified and as illustrated in the drawings.

That which I regard as new will be set forth in the claims.

Figure 2:
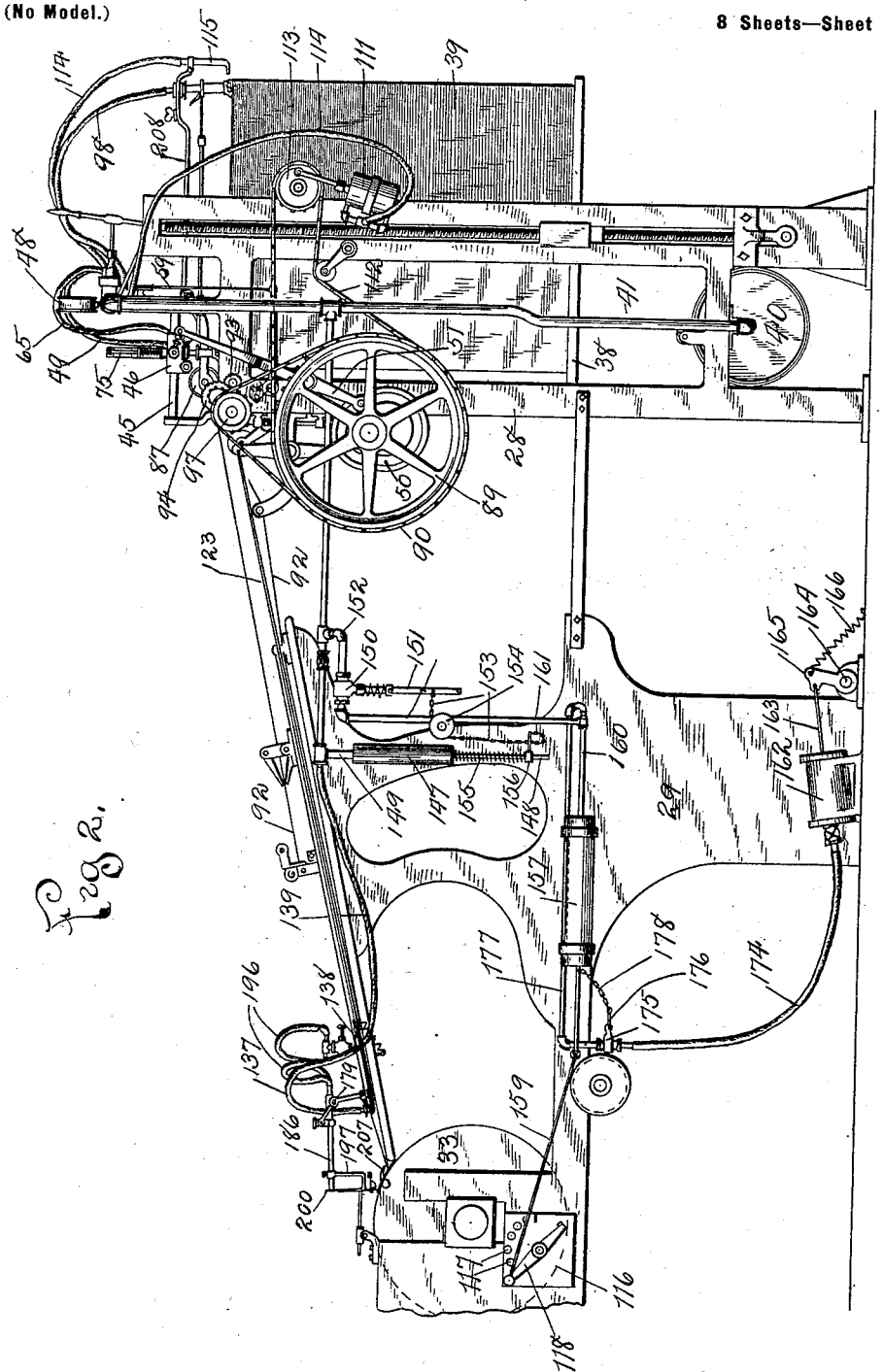
Figure 3:
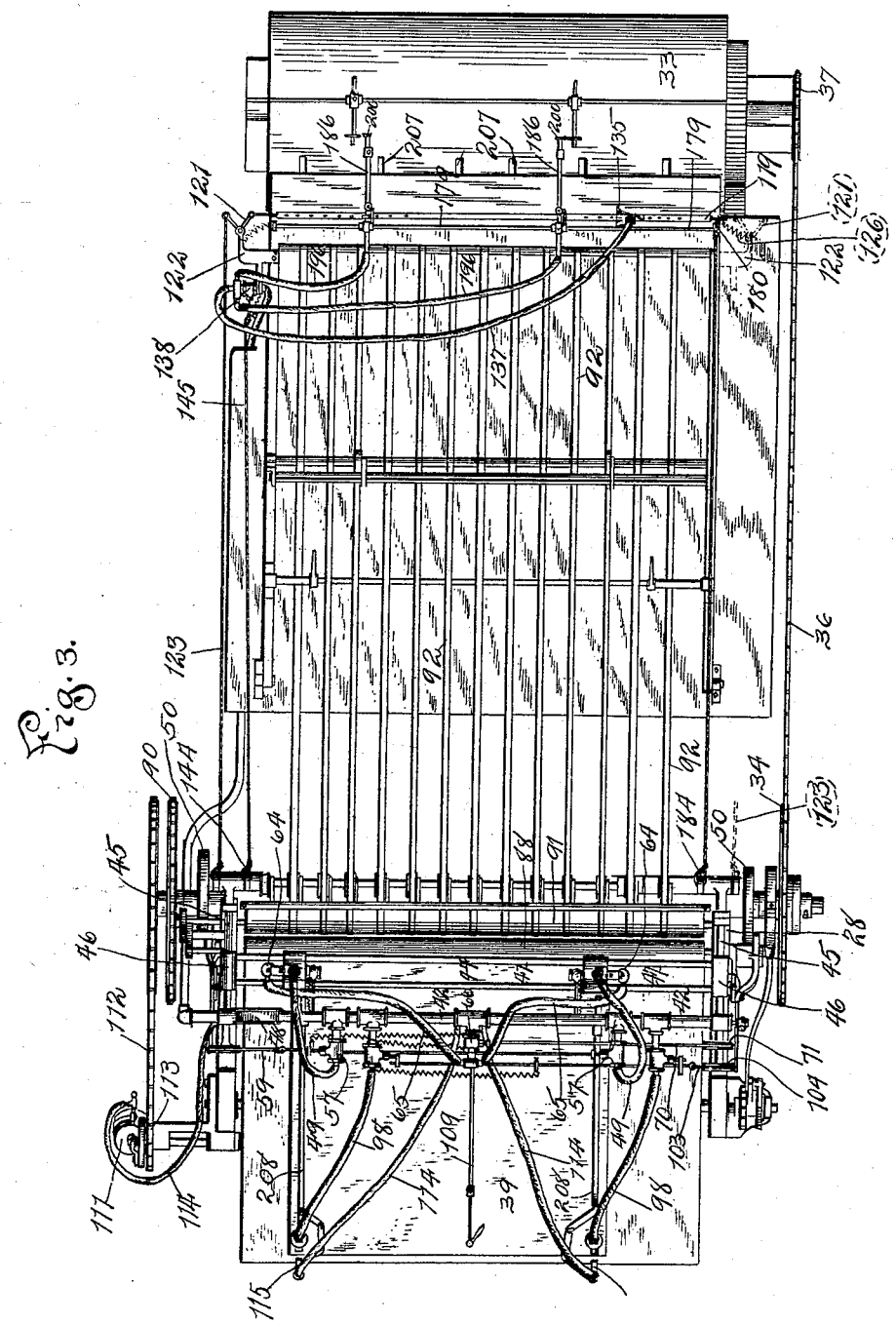

Referring to the accompanying drawings, Figure 1 is a side elevation showing the right-hand side of the machine. Fig. 2 is a side elevation showing the opposite or left-hand side of the machine. Fig. 3 is a top or plan view of the entire machine. Fig. 4 is a front elevation of the pneumatic sheet-feeding machine disconnected from a press. Fig. 5 is an enlarged detail, being a top or plan view of a portion of the vacuum-pipe on the top of that part of the machine shown in Fig. 4, showing the levers by which the valves are operated. Fig. 6 is an enlarged detail, being a front view of the parts shown in Fig. 5. Fig. 7 is an enlarged detail, being a vertical section on line 7 7 of Fig. 6. Fig. 8 is an enlarged detail, being a top or plan view of a portion of the side-registering mechanism. Fig. 9 is an enlarged detail, being a vertical section on lines 9 9 of Fig. 8. Fig. 10 is an enlarged detail, being a perspective view of the devices by which the sheets are pneumatically engaged in the process of securing side register, viewed from in front and below. Fig. 11 in an enlarged detail, being a top or plan view of one of the sheet-forwarding pneumatic picking devices and the device by which the same is positively lifted. Fig. 12 is a side elevation of the same. Fig. 13 is a front elevation of the same, partially in vertical section. Fig. 14 is an enlarged detail showing the forked arm by which the telescopic picker is engaged. Fig. 15 is an enlarged detail showing the mechanism by which a more slowly-moving tape-carrying roller is actuated by one of the feed-rollers which forward the sheet after the pickers have delivered it thereto. Fig. 16 is an enlarged detail, being an end view of the lower feed-roller, of the tape-carrying roller, and the gears connecting the same. Fig. 17 is an enlarged detail, being a view of the lever by means of which the devices for insuring proper register with the grippers of the printing-cylinder are lifted out of the way of the coming sheet and the cam by which said lever is operated. Fig. 18 is an enlarged detail, being a view of the lever operating the side-registering devices and the cam by which the said lever is operated. Fig. 19 is an enlarged detail, being a view of the lever by which the valves leading to the side-registering devices are operated and the cam for operating said lever. Fig. 20 is an enlarged detail, being a view of the lever by means of which the rear picker-valves are operated and the cam for operating said lever. Fig. 21 is an enlarged detail, being a side elevation of the devices by which the registry of the leading edge of the sheet is insured in position to be seized by the grippers of the printing-cylinder or, in case the sheet is not so delivered, the machine stopped. Fig. 22 is an enlarged detail, being a top or plan view of the same. Fig. 23 is an enlarged detail, being a front elevation of the same. Fig. 24 is an enlarged detail, being a vertical section on lines 24 24 of Fig. 22. Fig. 25 is an enlarged detail, being a vertical cross-section on lines 25 25 of Fig. 22. Fig. 26 is an enlarged detail, being a perspective view of the lower portion of one of the pneumatic pickers, showing the cup which engages the sheet; and Fig. 27 is an enlarged detail, being a vertical section on line 27 27 of Fig. 26.

In the drawings, 28 indicates the frame of the pneumatic sheet-feeding mechanism, and 29 the frame of a printing-press, to which the frame 28 is secured by means of cross-bars 30 and carrying a feed-table 31.

32 indicates a wheel mounted upon the driving-shaft of the press, to which a brake, hereinafter described, is applied for the purpose of stopping the press.

33 indicates one of the cylinders of the printing-press, which is provided with ordinary gripper mechanism 207, which is well known and needs no description here and may be of any approved form and character.

34 indicates a sprocket-wheel geared upon the driving-shaft 35. The wheel 34 is shown as driven by a sprocket-chain 36, connected with a sprocket-wheel 37 upon the same shaft as the cylinder 33 of the printing-press; but it of course may be driven in any other way and by any approved mechanism.

38 indicates a table upon which is mounted a pile of sheets 39. The table 38 is so mounted as to be automatically raised, carrying with it the pile of sheets 39, so as to preserve the top of the pile constantly at the same level as the sheets are fed off from the top. This mechanism may be of any approved form and construction. As this, however, forms no part of my present invention, it needs no further description here.

40 indicates a vacuum-chamber in which a vacuum is maintained to the desired extent by any suitable mechanism and out of which leads a vacuum-tube 41, which is carried upward to the top of the machine, as best shown in Fig. 2, and is provided with a horizontal extension 42, as best shown in Figs. 3, 4, and 6.

43 indicates a vacuum-gage by which the amount of the vacuum in the chamber 40 and tubes 41 and 42 is indicated, and it may be of any approved form and construction.

44 indicates a carriage which slides horizontally forward and backward upon guides 45 upon the frame 28, and consists of slide-blocks 46, which slide upon the guides 45 and are rigidly connected by rods 47.

48 indicates tubes which are adjustably mounted upon the rods 47 and are connected by flexible tubes 49 with the horizontal portion 42 of the vacuum-tube.

The carriage 44 is reciprocated back and forth upon the guides 45 by means of cams 50, mounted upon the shaft 35, and by levers 51, the lower ends of which engage with the cams 50, the upper ends being pivotally connected with the carriage.

52 indicates telescopic picker-tubes mounted upon the lower ends of the tubes 48 and provided at their upper ends with rims or shoulders 53.

54 indicates cups, preferably formed of rubber or leather, although they may be formed of any suitable compressible material, and are mounted upon the lower ends of the telescopic pickers 52.

55 indicates clamps which are mounted upon each side of the cups 54. One of the clamps 55 upon each cup is screw-threaded, so as to admit a thumb-screw 56, by the turning of which the distance between the clamps 55 may be diminished or increased, so as to compress or expand the lower end of the cup 54, as best shown in Figs. 26 and 27.

The flexible tubes 49 are connected with the vacuum-tube 42 through the medium of interposed valves 57, which may be of any approved construction and are operated simultaneously by a rod 58, connecting-cord 59, cam 60, mounted upon the main shaft 35, and lever 61, which is pivoted upon a rod 62, as is best shown in Fig. 4. One end of the lever 61 engages with the surface of the cam 60 and the other end is secured to the cord 59. As the lever 61 is moved by the cam 60 the rod 58 is pulled to the left in Fig. 5, opening the valves 57, the movement being timed, as hereinafter described. When the lever 61 is released by the cam 60, a contraction-spring 63 returns the rod 58 to its original position, closing the valves 57, the timing of which movement is also hereinafter described.

64 indicates cylinders which are mounted on the parallel rods 47 of the carriage 44 and are connected by flexible tubes 65 with the vacuum-tubes 42 through the medium of a valve 66, as is best shown in Figs. 5 and 6. The valve 66 is of any approved form and construction and is operated by a cam 67 and lever 68, which is mounted upon a shaft 69 and one arm of which bears upon the cam 67, the other arm being connected with a cord 70, which passes over a pulley 71 and is connected with the valve 66, as is best shown in Fig. 5. As the cam 67 bears upon the lever 68 the rope 70 is pulled to the right in Fig. 5, opening the valve, which is returned to its normal position and closed by a spring 72, (best shown in Fig. 5,) when the cam is released from the lever 68. The timing of the opening and closing of the valve 66 will be hereinafter described.

73 indicates a piston moving air-tight in the cylinder 64 and provided with a piston-rod 74.

75 indicates a rod the upper end of which is connected to the upper end of the piston-rod 74 and passes downward through a washer 76, which is mounted upon the upper end of an upright 77, secured to the framework of the carriage, as is best shown in Fig. 13.

78 indicates a compression-spring which bears upon an adjustable washer 79, which is mounted upon the rod 75 in such a way as to normally hold the rod 75 in the position shown in solid lines in Fig. 13 when there is no vacuum in the cylinder 64. The lower end of the rod 75 is bent at right angles and is provided with a forked end 80, as is best shown in Fig. 14, adapted to engage with the shoulder 53 of the telescopic picker-tube 52. When the valve 66 is open, a communication is established between the cylinder 64 and the vacuum-tube 42, thus producing a vacuum in the cylinder 64. The piston 73 is thereupon drawn down by air-pressure against the action of the expansion-spring 78, thus lowering with it the rod 75 and allowing the telescopic picker-tube 52 to drop by its own weight. When the valve 66 is closed, air is admitted below the piston 73 through a small opening 81, which being small will allow in the cylinder 64 a sufficiently complete vacuum to draw down the piston 73 when communication between it and the vacuum-tube 42 is open, but which when the connection is closed will allow the ingress of air sufficiently for the spring 78 by its expansion to lift the rod 75, and with it the piston 73, the forks 80 thus engaging with the shoulder 53 of the telescopic picker-tube 52, and thus positively lifting the same. The timing of these movements will hereinafter be described.

82 indicates a valve which communicates with the tube 48 and which may be of any approved construction.

83 indicates a valve-rod which extends backward, as shown in Figs. 11 and 12, and carries upon its outer end an arm 84.

85 indicates an upright which is secured to a cross-bar 86 on the frame 28. As the carriage 44 moves forward the arm 84 upon the valve-rod 83 will be brought into contact with the upright 85 and the valve 82 thereby opened, so as to admit air into the tube 48. The timing of this movement will be hereinafter described.

The operation of the devices so far described is as follows: As the carriage 44 is at the rearward limit of its motion, the valves connecting the tubes 48 with the vacuum-tube 42 being closed, the valve 66 is opened by the operation of the cams and levers above described, thus establishing communication between the cylinder 64 and the vacuum-tube 42. By means of the air-pressure thus caused above it, as above described, the piston 73 descends, carrying with it the rod 75, as above described, allowing the telescopic picker-tubes 52 to drop upon the surface of the top sheet near its forward edge. Thereupon the valves 57 are opened by the operation of the cams and levers above described, the movements of which are so timed as to open the valves 57 at this moment. Communication is thus established between the tube 48 and the vacuum-tube 42, which causes the cups 54 to engage with the surface of the paper. By the pressure of air below the telescopic picker-tubes 52 thereupon will ordinarily rise, carrying with them the sheet of paper. To insure this operation, however, as soon as the cups 54 have engaged the paper by the vacuum in said cups the valve 66 is closed by the operation of the cam and lever above described, which are timed to so operate. Immediately air passing into the cylinder 64 through the small opening 81 causes the piston 72 to be lifted by the operation of the expansion-spring 78, lifting the rod 75, and the forks 80, engaging with the shoulder 53 of the telescopic picker-tube 52, positively raise the said picker-tube 52. Thereupon by the operation of the cams and levers above described the carriage is moved forward. The cams and levers above described, which open the valves 57, are so arranged as to keep the valve 57 open during the forward movement of the carriage until it reaches the forward limit of its motion. Thereupon by the operation of said cams and levers the valve 57 is closed. Just as the carriage reaches this position, however, the arm 84, coming in contact with the upright 85, has opened the valve 82, as above described, so as to permit access of air into the tube 48. Freed thus from the pressure of air below it the sheet is freed from engagement with the cups 54. The carriage 44 thereupon is moved backward by the operation of the cams and levers above described to its extreme rearward position.

87 88, as is best shown in Fig. 1, indicate feed-rollers, which are driven in any appropriate manner from the driving-shaft of the machine. They are shown in Fig. 2 as driven by a sprocket-wheel 89 and sprocket-chain 90. These feed-rollers are of the ordinary well-known kind and are adapted to engage the lead edge of the sheet between them and feed it forward. The position of the feed-rollers 87 88 is such and the movement of the carriage is such that the lead edge of the sheet is fed, by the operation of the pneumatic pickers above described, between the feed-rollers 87 and 88, and the sheet is released from the pneumatic pickers, as above described, just as its lead edge enters the bite of the feed-rollers.

91 indicates a tape-carrying roller, which is journaled in the framework 28 of the machine and carries tapes 92, by which the sheets are fed forward.

Referring to Figs. 15 and 16, 93 indicates a gear-wheel which is keyed or otherwise rigidly secured to the shaft of the feed-roller 88. 94 indicates an idler-gear which meshes with the gear 93 and is journaled upon the frame 28. The gear 94 is larger and contains more teeth than the gear 93. 95 indicates a gear which is rigidly secured upon the same shaft as the gear 94 and rotates with it and contains a fewer number of teeth than the gear 94. 96 indicates a gear which is keyed or otherwise rigidly secured to the shaft of the tape-roller 91 and contains a greater number of teeth than the gear 94. 97 indicates a sprocket-wheel, which is driven from the sprocket-wheel 89 by means of the sprocket-chain 90. It will be obvious from this construction that the feed-rollers 87 88, being driven from the gear-wheel 89 by means of the sprocket-chain 90, sprocket-wheel 97, and intermediate gears 94 and 95, operating upon the gear 93, will be driven at considerably greater speed than the tape-carrying roller 91. The reason for this is that the tapes 92, being carried at a lower surface speed than the feed-rollers 87 88, will carry the sheet forward at a diminished speed after the sheet has left the feed-rollers 87 88, so that it may not be thrown too rapidly into connection with the front-registering devices and automatic stopping devices hereinafter described. I have found that the proportion of difference between the speed of the feed-rollers and of the tapes in practice should be about that illustrated in Figs. 15 and 16 and shown by the different-sized gears therein illustrated. It may, however, vary in practice according to the nature of the work which is being done and the character of paper which is being fed, the essence of my invention in this respect being to have the carrying-tapes 92 move at a surface speed not so great as that of the feed-rollers 87 88, for the purposes above mentioned. The carrying-tapes 92 may be of any approved kind and method of operation and forward the sheets to the front-registering and automatic stopping devices hereinafter described.

It has been somewhat difficult in prior machines of this character to insure the proper feeding forward of only one sheet at a time by the pneumatic pickers above described, and I have found in practice that devices and adjustments that will feed forward with certainty a single sheet of one thickness or a certain quality of paper will not accurately feed forward paper of a different thickness or of different quality. It is to assist in positively securing this that I have devised the form of cups upon the pickers above described. To insure, however, positively the accurate feeding of only one sheet at a time and to prevent two sheets, or even more, being lifted by the pneumatic action of the front pickers above described, I have devised the following mechanism:

98 indicates flexible tubes which communicate with the vacuum-tube 42 through the medium of interposed valves 99. The valves 99 may be of any approved form and construction and are operated by a rod 100, connected by arms 101 to valve-stems 102, as is best shown in Fig. 5. The rod 100 is connected to a cord 103, which passes over a pulley 104 and is connected to one end of a lever 105, which is journaled in the frame 28, and the other end of which is operated by a cam 106, keyed or otherwise rigidly secured to the shaft 35 of the machine. The shape of this cam is peculiar and is best shown in Fig. 20. As will be seen by reference to Fig. 20, the cam 106 is of such shape as to first bear in its rotation upon the lever 105, so as to move its lower end outward and retain it in its outer position momentarily, thus opening the valves 99 for a comparatively short interval. As the cam rotates its first and shorter bearing-surface is freed from the lever 105, and immediately upon leaving its shorter bearing-surface the rod 100 is returned to its former position by means of retractile springs 107, closing the valves 99. Almost immediately the second and long bearing-surface is brought to bear upon the lever 105, the valves 99 are again opened and held open for a comparatively long time as the second and long bearing-surface passes beyond the lever, the lever is freed from that bearing, and the valve-rods again move to the left in Fig. 5 by the operation of the spring 107 again closing the valves. The remainder of the cam, as shown in Fig. 20, is circular, so that the lever is not thrown outward, and the valves consequently remain closed until the first and short bearing-surface again bears upon the lever, as above described.

The flexible tubes 98 are connected with tubes 108, which are carried by suitable supports 109 upon the frame 28, immediately over the rear end of the pile of sheets 39.

110 indicates telescopic picker-tubes slidingly mounted upon the tubes 108 and having upon their lower ends cups 54, which are preferable like the cups above described (best shown in Figs. 26 and 27) and are preferably provided also with clamps 55 and thumb-screws 56 for purposes of adjustment above described.

111 indicates a force-pump which is mounted upon the frame 28 and is driven in any appropriate manner. The way in which I prefer to drive it is that shown in Fig. 2—that is, by the sprocket-wheel 89, a sprocket-chain 112, and sprocket-wheel 113. It may, however, be driven in any other appropriate way.

114 indicates flexible tubes which are connected with the force-pump 111, are carried upon the frame 28, and are provided upon their ends farthest from the pump with blowers 115, which are supported upon suitable supports 208 from the frame of the machine 28 and have their blowing-nozzles located behind the pile of sheets and just above the level of the top of the pile, as is best shown in Fig. 2. The operation of the pump 111 is to blow a continuous blast of air through the tubes 114 and blowers 115 toward the pile of sheets.

The above devices coöperate with the pneumatic sheet-forwarding devices above described, and their coöperative action is as follows: As soon as the carriage 44, which carries the pneumatic pickers above described, has advanced in its forward movement above described, carrying the sheet with it, a sufficient distance to free the rear of the sheet which is being forwarded from the rear of the sheet immediately below it and leave a portion of the rear end of the sheet below it exposed, the bearing-surface of the cam 106 being free from the lever 105 and the valves 99 being closed, the rear telescopic picker-tubes 110 fall by their weight, as above described, upon the rear end of the stationary sheet, behind the rear end of the front sheet, which is being forwarded by the pneumatic forwarding devices above described, and remain so, resting upon the sheet until the shorter bearing-surface of the cam 106 bears upon the lever 105, the movements of the cam 106 and lever 105 being correspondingly timed. As the shorter bearing-surface of the cam 106 bears upon the lever 105 the valves 99 are opened, as above described. The valves 99 being open, communication is at once established between the vacuum-tube 42 and the rear picker-tubes 110. As there is always more or less air between the superposed sheets of the pile 39, the air-pressure below will at once cause the upper surface of the sheet to engage with the cups 54 upon the rear telescopic picker-tubes 110 and will cause said telescopic tubes 110 to at once rise upon the tubes 108, lifting the rear end of the sheet with them. The construction and shape of the cups 54 upon the rear picker-tubes 110 being that best shown in Figs. 26 and 27 causes the sheet engaged thereby to "crimp" by the engagement of said cups with said sheet. It sometimes happens that more than one sheet will be engaged and lifted by the action of the cups 54 upon the rear picker-tubes 110 in this first lifting of the rear end of the sheet. It will be obvious that the rear end of the sheet is lifted and is held in its raised position by air-pressure, as above described, only as long as the shorter bearing-surface of the cam 106 engages with the lever 105. As this shorter bearing-surface of the cam 106 is freed from the lever 105, as above described, the valves 99 are closed by the action of the spring 107, as above described, and the sheet by this shutting off of the communication with the vacuum-chamber is freed from the pickers 110 and falls, the pickers 110 dropping with the sheet by their own weight. As was said above, the operation of the cups 54 upon the sheet in their first lifting is to slightly crimp the paper, and this crimp being caused by a slight sidewise movement of the top sheet upon the sheet below it will be confined to the top sheet alone, and this crimping or slight rumpling of the top sheet remains. The carriage 44 being in its rearward position, the long bearing-surface of the cam 106 comes at once into operation, again opens the valves 99, and establishes communication with the vacuum-tube 42. The cups 54 upon the rear picker-tubes 110 immediately engage the sheet by air-pressure and the pickers through the same air-pressure again rise, carrying with them the sheet. Inasmuch as the top sheet has been crimped or slightly rumpled, as above described, the air gains access below the sheet through this crimping thereof, and upon this second rising of the picker-tubes 110 will with certainty cause only one sheet to adhere to the cups 54 upon the rear picker-tubes 110. The blowers 115, blowing a constant current of air, as above described, forward toward the front of the pile of sheets, blow a current of air under the top sheet, held in its raised position for a comparatively long interval of time, assisting in its separation from the sheet below it from the rear to the forward edge of the sheet, which has in the meantime become engaged with the front pickers, as above described. This second opening of the valves 99 is, as has been said above, much longer than the first opening of said valves. The operation of the cam 106 is so timed with reference to the operation and movements of the carriage 44 and with the movements and operation of the rod 75, piston-rod 74, and piston 73 that during the second lifting of the rear end of the sheet, as above described, communication between the front pickers 52 and the vacuum-tube 42 is opened, the rod 75 is raised by the operation of the springs 78, as above described, the pickers 52 are raised, lifting the front edge of the sheet with them, and as the valves 99 are closed the second time and the sheet freed from engagement with the rear pickers 110, as above described, the carriage 44 begins its forward movement, feeding the sheet forward, as above described, into the bite of the feed-rollers 87 88, as above described. The lever 105 being, as above described, freed from the operation of the longer bearing-surface of the cam 106, the valves 99 are closed, shutting off communication between the rear pickers 110 and the vacuum-chamber 40, and the rear picker-tubes, freed from the sheet with which they have just been engaged and which has been carried forward by the operation of the front pneumatic forwarding devices, as above described, drop by their own weight upon the top surface of the pile of sheets below, near the rear edge thereof, as above described.

The above description applies to the operation of the pneumatic sheet-forwarding devices when used, for instance, for forwarding sheets into an ordinary folder or some similar machine. When, however, these sheet-forwarding devices are to be used in connection with a printing-press and for forwarding sheets into a press to be printed, it becomes necessary to insure their accurate delivery in proper register, both laterally and longitudinally, to the cylinder of the press and also to provide means by which in case through any accident a proper lateral register is not insured or a proper register in exact position to be seized by the grippers of the printing-cylinder is not secured the press may be automatically stopped. The following-described devices are new and improved mechanism by which these results may be more perfectly secured. As was said above, 29 indicates the frame of a press, connected by bars 30 with the frame 28 and carrying a feed-table 31 and provided with a gripper-cylinder 33. Such presses as that indicated are now very ordinarily driven by electricity, and I have shown in Fig. 2 for the sake of illustrating the operation of the hereinafter-described devices a switchboard 116, having contact devices 117 and a lever 118, by the movement of which the connection with a dynamo is turned on or shut off and which may be of any approved construction. The press may, however, be otherwise driven and the power by which the press is driven shut off or turned on by any other well-known or approved mechanism.

119 indicates a bar which is slidingly mounted in the table 31 in a suitable slot 120 therein, so that its top surface is flush with the surface of the table and so as to slide freely longitudinally of itself therein. The position of this bar 119 in the slot 120 is best shown in Figs. 8 and 9.

121 indicates a bell-crank lever which is pivotally mounted upon a bracket 122 upon the table 31. One arm of the bell-crank lever 121 is secured to a cord 123, the other end of which is secured to the upper end of a lever 124, which is journaled in suitable bearings on the frame 28, and the other end of which is operated by a cam 125, keyed upon the main shaft 35, as is best shown in Fig. 18. When the bearing-surface of the cam 125 comes into operative position, the lever 124 operates to pull the cord 123, move the bell-crank lever 121, the other arm of which is connected to the slide-bar 119, and thus move the slide-bar 119 to the right in Fig. 8, the same being to the left in Fig. 3. When the lever 124 is freed from the bearing-surface of the cam 125, the slide-bar 119 is returned to its former position by a retractile spring 126. (See Fig. 3.) I have shown in Fig. 4 two levers 124 and cams 125, one upon each side of the machine, and have indicated in dotted lines on Fig. 3 the bell-crank lever 121, bracket 122, and cord 123. In operation only the lever and cam upon one side of the machine will be used. The brackets 122, bell-crank lever 121, and cord 123 may be shifted to the other side of the machine, as indicated, so as to operate the slide-bar 119 from the other side, in which case the spring 126 will also be shifted to the other side of the machine. The object of this will be hereinafter stated. The lateral movement of the bar 119 is controlled by a shoulder 127, (best shown in Figs. 8 and 9,) and this shoulder may be adjusted in any position within desired limits by means of a screw-threaded rod 128, preferably formed integral therewith, as is best shown in Figs. 8 and 9, although it may of course be rigidly secured thereto. The screw-threaded rod 128 passes through a thumb-nut 129 and lock-nut 130, by the turning of which the desired adjustment may be secured. One of the adjustable shoulders is placed upon each side of the machine in the slot 120, the object of the shoulder being to limit the return motion of the slide-bar 119 by means of the spring 126 to a proper position to insure lateral registry of the sheets, as above described.

131 (see Figs. 8, 9, and 10) indicates a guide, which is removably secured to the slide-bar 119 by a thumb-screw 132, which engages threaded openings 133 in said slide-bar 119. The guide 131 is provided with a shoulder 134, adapted to engage with one side edge of the sheet, as hereinafter described, and is preferably provided with an upturned and rounded portion 135, so that the sheets fed down by the tapes may be guided beneath it. The guide 131 is provided with a socket 136, which is adapted to receive a flexible tube 137 by means of a suitable air-tight connection 137$^a$, and is also provided with openings 131$^a$, opening out of the bottom of the socket 136 upon the lower surface of the guide, as is best shown in Fig. 10. The flexible tube 137 is connected with a valve 138, as is best shown in Figs. 2 and 3, and the valve 138 is connected by tubes 139 140 with the vacuum-tube 41, as is best shown in Fig. 2. The valve 138 may be of any approved form and construction and is operated by a cam 141, which is keyed to the shaft 35 and lever 142, having an arm 143, which bears upon the cam 141, and an arm 144, which is connected by a cord 145 with the valve-stem. As the cam 141 rotates the lever 142 is rocked, pulling the cord 145, and thus opening the valve 138. As the cam-surface ceases to bear the valve 138 is closed by a suitable spring 146. When the valve 138 is opened, it will be seen that communication is at once established between the vacuum-chamber and the tube 137, opening into the socket 136 of the guide 131.

147 indicates a cylinder which is mounted upon the frame 29 and is provided with a suitable air-tight piston moving therein, which has a piston-rod 148. The cylinder 147 leads by an open connection 149 into the tube 140, which communicates with the vacuum-tube 41. There is thus always a vacuum above the piston in the cylinder 147, operating by the pressure of air below it to hold the piston in the upper end of the cylinder 147, the piston-rod 148 being in the position shown in Fig. 2, except when opened to access of air above the piston, as hereinafter described.

150 indicates a valve of any approved construction, having a valve-rod 151 and communicating by means of a tube 152 with the tube 140, and thus with the vacuum-tube 41.

153 indicates a chain or other flexible connection, one end of which is connected with the valve-stem 151 and the other end with the lower end of the piston-rod 148, passing over a pulley 154, as is best shown in Fig. 2.

155 indicates an expansion-spring which bears upon the lower end of the cylinder 147 and upon a lug 156, carried upon the piston-rod 148 and operating when air is admitted above the piston in the cylinder 147 to force the rod 148 downward, and thus through the medium of the flexible connection 153 with the valve-stem 151 to open the valve 150.

157 indicates a cylinder which is secured to the frame 29 and is provided with a suitable piston within having a piston-rod 158, which is connected by a link 159 with the lever 118, as is best shown in Fig. 2. The cylinder 157 is connected by means of tubes 160 161 with the valve 150, as is best shown in Fig. 2.

162 indicates a cylinder which is mounted upon the frame 29 and is provided with a suitable piston within having a piston-rod 163, one end of which connects with a rock-shaft 164, having an arm 165, which is connected with the outer end of the piston-rod 163.

166 indicates a retractile spring, one end of which is connected with the upper end of the arm 165 and the other end with the floor or bed-plate, upon which the machine rests, as is best shown in Figs. 2 and 3.

167 (see Fig. 1) indicates a bell-crank lever which is pivotally mounted in suitable bearings 168, secured to the floor or bed-plate of the machine and having a long arm 169 and short arm 170. The long arm 169 is connected with a chain 171, which is wound around the rock-shaft 164 and secured thereto.

172 indicates a brake which is adapted to bear upon the wheel 32 and is connected at one end with the short arm 170 of the bell-crank lever 167 and at the other end with a suitable support 173, secured to the floor or bed-plate of the machine. I have shown this form of brake in Fig. 1, and it is the form that I prefer to use. It is obvious, however, that any other well-known form of brake might be used, and I do not limit myself to the use of the form shown. The cylinder 162 is connected by means of a pipe 174 with a valve 175, which is provided with a valve-stem 176, and may be of any approved form and construction. The valve 175 is connected by means of a pipe 177 with the pipe 161, as is best shown in Fig. 2.

178 indicates a flexible connection, one end of which is secured to the piston-rod 158 and the other to the valve-stem 176.

179 indicates a rock-shaft which is journaled in suitable bearings above the table 31, as is best shown in Figs. 1, 2, and 3 and in detail Figs. 21 to 25, inclusive, and has rock-arms 180 181, the arms 181 being secured to the rock-shaft 179 by a set-screw 182, as is best shown in Figs. 21 and 22. The arm 180, as is best shown in Fig. 1, is connected by means of a cord 183 to a lever 184, which is journaled in suitable bearings in the frame 28 and the lower end of which engages with a cam 185, which is keyed upon the main shaft 35.

186 indicates air-tubes which are mounted in sleeves 187. The sleeves 187 are rotatably carried upon the rock-shaft 179, as is best shown in Fig. 24. A portion of the rear end of the tubes 186 is screw-threaded, as is best shown in Figs. 21 and 22.

188 indicates thumb-nuts which engage with the screw-threaded portions of the tubes 186.

189 indicates split sleeves which are mounted upon the tubes 186, so that the tubes 186 pass freely therethrough, and are provided with lugs 190, projecting from one side thereof, as is best shown in Figs. 21 to 25, inclusive, and are secured upon the tubes 186 by means of thumb-screws 191, as is best shown in Fig. 25.

192 indicates a bearing which is rotatably mounted, by means of a pin 193, in the outer end of the arm 181 and is secured therein by means of a split pin 194, as is best shown in Figs. 21, 23, and 25.

195 indicates thumb-screws which are carried in suitable openings in the bearings 192, their lower ends being screw-threaded and engaging with suitable screw-threaded openings in the lugs 190, as is best shown in Figs. 21, 23, and 25.

196 indicates flexible pipes which communicate with and open into the valve 138.

197 indicates bent arms which are secured upon the tubes 186, near their forward ends, by set-screws 198, as is best shown in Figs. 21 and 22.

199 indicates levers which are pivotally mounted upon the lower ends of the bent arms 197, as is best shown in Fig. 21. The longer arms of the levers 199 are provided at their upper ends with caps 200, preferably formed integral therewith, as is best shown in Figs. 21 and 23, though they may of course be secured thereto in any appropriate manner and adapted, when brought in contact therewith, to close the forward ends of the tubes 186. As will be seen in Fig. 21, the journaled ends of the bent arms 197, which support the levers 199, are a short distance back of the forward ends of the tubes 186, so that the levers 199 will, until acted upon by the sheets, as hereinafter described, fall backward by their own weight into the position indicated by dotted lines in Fig. 21, being prevented from falling farther back by a stop 201, mounted upon the bent arm 197. The short arms of the levers 199 are provided with rods 202, having adjustable counterpoises 203 mounted thereon and adjustably secured thereto by set-screws 204. The weight of the counterpoises and their position upon the rods 202 are such as to allow the levers 199 to fall backward into the position indicated by dotted lines in Fig. 21, but at the same time to counterbalance their weight in such a way that the forward thrust of the sheet of paper against the lower ends of the levers 199 as the sheets are carried down by the tapes will be sufficient to throw the lower and short arms of said levers 199 forward, bringing the caps 200 in contact with the forward ends of the tubes 186, as is shown in solid lines in Fig. 21, which shows the sheet with its forward edge bearing upon the lower arms of the levers 199. The lower arms of the levers 199 are also provided with bent guides 205, which operate to insure the bringing of the forward ends of the sheets against the lower ends of the levers 199 and to close the tubes 186 with the caps 200, as above described. These levers 199, coming in contact with the forward ends of the sheets, as above and as hereinafter described, operate as forward guides to deliver the oncoming sheet accurately and in register with guides 206 of the printing-cylinder 33, which are of the ordinary form and construction, such as are always found in printing-presses and which operate to insure the forward edge of the sheet being in exact alinement to be seized by the grippers 207 of the printing-cylinder when they come into operative position. To insure this proper delivery of the forward ends of the sheets in position to be seized by the grippers 207, (which being of the ordinary and usual construction need not be further described,) it is necessary that the lower ends of the levers 199 at the point at which the forward end of the sheet engages them should be in alinement with the printing-press guides 206. It is also necessary that the lower ends of the levers should be vertically adjustable. To that end I have provided the tubes 186 with the screw-threaded portions, the nut 188, the split sleeve 189, set-screw 194, and the respective bearings thereof, above described. In order to adjust the lower ends of the levers 199 vertically, the set-screw 194 is turned, thus by its engagement with the lug 190 lifting the tube 186 and with it the levers 199 to the desired position, the thumb-screw 194 bearing upon the bearing 192, carried in the arm 181, as above described. It will be obvious that when the screw 194 is turned in the opposite direction the forward end of the arm 186 will fall of its own weight as the screw is turned. To longitudinally adjust the tube 186 and with it the levers 199, the thumb-nut 188 is turned, which engaging with the screw-threaded portion of the rod 186 bears against either the sleeve 187 or the split sleeve 189, according to the direction in which the nut is turned, moving the tube 186 longitudinally the required distance through the sleeves 187 and 189 forward or backward, according to the direction in which the thumb-nut 188 is turned.

The operation of the devices last above described is as follows: The sheet fed forward by the pneumatic sheet-forwarding devices above described into the bite of the rollers 87 and 88 is by them fed upon the feed-tapes 92 and carried forward down the table 31 above the slide-bar 119 until its forward edge engages with the lower arm of the lever 199, throwing it forward and closing the ends of the tube 186 by the caps 200. The forward end of the sheet is then, as above described, in alinement with and against the guides 206 of the press in accurate position to be seized by the grippers 207 of the cylinder 33 when they come into operative position. It will be noticed here that as the lower arm of the lever 199 is considerably shorter than the other a very slight movement of the paper against it will operate to close the tubes 186 by the caps 200, and that, on the other hand, if the forward edge of the sheet of paper is a very slight distance away from the lower ends of the levers 199 at the time that the grippers 207 come into operative position the tubes 186 will not be closed by the caps 200. I have found in practice that the proper proportion between the two arms of the lever in order to make it best operative should be about that shown in detail, Figs. 21 and 23. The sheet being thus in position, with its forward edge in accurate alinement against the lower ends of the levers 199 and with the caps 200 closing the tubes 186, the cam 125 bearing upon the lever 124, operates to move the bar 119 longitudinally to the right in Fig. 8, thus bringing the shoulder 134 of the guide 135 into contact with the sides of the sheet and moving the sheet bodily over to the right in Figs. 8 and 9, being to the left in Fig. 3. As soon as the slide-bar 119 has reached the limit of its motion in that direction the cam 141 is so timed as to operate the arm 143 of the lever 142 and by means of the arms 144 and cord 145 to open the valve 138, thus establishing connection between the openings 131ª in the guide 131 and the vacuum-tube 141 through the medium of the tubes 139 and 140 above described. The pressure of the air at once causes the sheet to adhere to the lower surface of the guide 131, and the lever 124 being at the same time freed from the bearing of the cam 125 the spring 126 returns the slide-bar 119 to its original position against the shoulder 127, which is adjusted, as above described, by means of the screw-threaded rod 128, thumb-nut 129, and lock-nut 130 in such position that when the slide-bar 119 is against the shoulder 127 the side edge of the sheet is in accurate lateral alinement with the printing-press. The bearing-surface of the cam 141 is then freed from the arm 143 of the lever 142, the valve 138 is closed, and the sheet freed from engagement with the guide 131. All these movements are so timed that as the sheet is freed from pneumatic engagement with the guide 131 the grippers 207 of the press come into operative position and seize the leading end of the sheet.

In order to accommodate the devices above described to varying widths of paper, I construct the guide 131 so as to be capable of being mounted at different points upon the slide-bar 119 by means of the thumb-screw 132 and screw-threaded holes 133 above described. It is sometimes desirable to make the register from the other side of the press from that shown in solid lines in the figures, and to that end the guide 131 may be turned around and secured to the other end of the slide-bar 119, in which case the cord 123 will be disconnected from the left-hand side, in which it is shown in Fig. 3, and connected upon the right-hand side, as shown in dotted lines in Fig. 3, the bell-crank lever 121 being mounted upon the right-hand side and the spring 126 upon the left-hand side of the machine, as shown in dotted lines in Fig. 3.

In case through any accident a sheet is not delivered so as to be engaged by air-pressure with the guide 131, as above described, the operation of the devices above described will be as follows: When the valve 138 is opened, as above described, there being no sheet below the openings 131ª in the guide 131, so as to close said openings by the engagement of the sheet with the lower surface of the guide, the air from the outside will pass through the openings 131ª and, the valve 138 being open, will pass through the pipe 139 into the cylinder 147 above the piston, thus permitting the spring 155 to force the piston-rod 148 downward. As the downward movement of the piston-rod 148 continues the flexible connection 153 is made taut, operating upon the valve-rod 151 and opening the valve 150. The valve 150 being open, communication is established between the cylinder 157, through the pipes 160, 161, 140, and 41, with the vacuum-chamber 40, causing a vacuum in the rear end of said cylinder 151 and drawing the piston inward. By means of the connection 159 between the piston-rod 158 and the lever 118 the power is shut off from the machine. As the piston-rod 158 passes still farther inward after shutting off the power the chain 178, operating through the valve-rod 176, opens the valve 175, thus establishing connection between the cylinder 162 and the vacuum-chamber 40, by means of the pipes 174 and 177, through the open valve 150 and pipe 140, to the pipe 41. A vacuum being thus established in the forward end of the cylinder 162, the piston contained therein is drawn inward, thus pulling forward the arm 165 of the rock-shaft 164 and tightening the brake 172 upon the wheels 32 and stopping the press.

In case the lead edge of the sheet through some accident does not come far enough forward to engage with the lower ends of the levers 199, so as to be, as above described, in accurate alinement with the guides upon the press and in position to be seized by the grippers, the operation is as follows: The lead edge of the sheet not coming far enough down to engage with the lower ends of the levers 199, there is nothing to throw the lower ends forward and to close the ends of the tubes 186 by means of the caps 200, and the levers 199 remain in their normal position. (Shown in dotted lines in Fig. 21.) When therefore the valve 138 is opened by the devices above described for the purpose of making side registry of the sheets, as above described, the air passes from the outside into the open ends of the tubes 186, through the valve 138, through the tube 139, above the piston in the cylinder 147. Freed thus from the vacuum above it, the spring 155 forces the piston-rod 148 downward, and the power by which the press is driven is automatically thrown off and the press braked in the same manner as last above described.

As I have said above, I have indicated in the drawings electrical shut-off devices 116 117 118 in case the machine is driven by electricity, which is the method of driving it which I prefer to use. I do not wish to confine myself, however, to these devices, as it is obvious that the machine could be driven in any other suitable way by any other appropriate power, and the power could be shut out of operation by any appropriate device connected with the devices which I have described. For instance, the piston-rod 158 could be connected with belt-shifting mechanism such as that shown and described in Letters Patent to me, No. 588,452, dated August 17, 1897.

In the above specification I have used the words "forward" and "backward." Wherever those words are used they refer, respectively, to directions to the right and to the left in Fig. 1—that is, toward the press end of the machine and toward the end of the machine containing the pile of sheets. I have also used the words "front" and "rear." Wherever found those words are to be taken as referring, respectively, to a position or direction toward the right in Fig. 1 and toward the left in Fig. 1.

That which I claim as my invention, and desire to secure by Letters Patent, is—

1. In a sheet-feeding machine, the combination with a carriage, mechanism for reciprocating the same, extensible picker mechanism carried by said carriage and adapted to engage a sheet of paper, valves controlling said pickers, and mechanism adapted to automatically open and close said valves as said carriage reciprocates, of pneumatically-operated mechanism adapted to positively lift said picker mechanism before the forward movement of said carriage begins and to allow said picker mechanism to drop at the rearward limit of the motion of said carriage, substantially as described.

2. In a sheet-feeding machine, the combination with a carriage, mechanism for reciprocating the same, extensible picker mechanism carried by said carriage and adapted to engage a sheet of paper, valves controlling said pickers, and mechanism adapted to automatically open and close said valves as said carriage reciprocates, of a spring-actuated rod adapted to engage said picker mechanism and normally raise and hold the same in a raised position, pneumatically-operated mechanism adapted to temporarily force said spring-actuated rod downward to allow said picker mechanism to fall and engage with the sheet, valves controlling said pneumatically-operated mechanism, and mechanism adapted to automatically open and close said valves, substantially as described.

3. In a sheet-feeding machine, the combination with a carriage, mechanism for reciprocating the same, extensible picker mechanism carried by said carriage and adapted to engage a sheet of paper, valves controlling said picker mechanism, and mechanism adapted to automatically open and close said valves as said carriage reciprocates, of a spring-actuated rod adapted to engage said picker mechanism and normally raise and hold the same in a raised position, pneumatically-operated mechanism mounted on said carriage and adapted to temporarily force said spring-actuated rod downward to allow said picker mechanism to fall and engage with the sheet, valves controlling said pneumatically-operated mechanism, and mechanism adapted to automatically open and close said valves, substantially as described.

4. In a sheet-feeding machine, the combination with a carriage, mechanism for reciprocating the same, extensible picker mechanism carried by said carriage and adapted to engage a sheet of paper, valves controlling said picker mechanism, and mechanism adapted to automatically open and close said valves as said carriage reciprocates, of a spring-actuated rod adapted to engage said picker mechanism and normally raise and hold the same in a raised position, a cylinder mounted on said carriage, a piston mounted in said cylinder and connected with said spring-actuated rod, a vacuum-tube connected with said cylinder below said piston, valves controlling said vacuum-tube, and mechanism adapted to automatically open and close said last-named valves as said carriage reaches its rearward position, substantially as described.

5. The combination with a pneumatic picker, of a flexible cup mounted on said picker and adapted to engage with a sheet of paper, and a clamp adapted to adjustably compress said cup laterally, substantially as described.

6. The combination with an extensible pneumatic picker, of a flexible cup mounted on said picker and adapted to engage with the surface of a sheet of paper, clamps bearing on said cup, and a thumb-screw engaging said clamps and adapted to adjustably compress said cup laterally, substantially as described.

7. In a sheet-feeding machine, the combination with mechanism adapted to engage the front end of a sheet and feed the same forward, of extensible picker mechanism adapted to engage the rear end of the sheet, a vacuum-tube connected with said extensible picker mechanism, valves controlling said vacuum-tube, and mechanism adapted to automatically open and close said valves a plurality of times before said sheet engaging and forwarding mechanism begins to forward the sheet, substantially as described.

8. In a sheet-feeding machine, the combination with mechanism adapted to engage the front end of a sheet and feed the same forward, extensible picker mechanism adapted to engage the rear end of the sheet, a vacuum-tube connected with said extensible picker mechanism, valves controlling said vacuum-tube, and mechanism adapted to automatically open and close said valves a plurality of times before said sheet engaging and forwarding mechanism begins to forward the sheet, of blowers adapted to blow a current of air forward from the rear beneath said sheet as the same is raised, substantially as described.

9. In a sheet-feeding machine, the combination with mechanism adapted to engage the front end of a sheet and feed the same forward, of extensible picker mechanism adapted to engage the rear end of the sheet, a vacuum-tube connected with said extensible picker mechanism, valves controlling said vacuum-tube, and mechanism adapted to automatically open and close said valves twice before the sheet-forwarding mechanism begins to forward the sheet, the first of said openings of said valves being for a shorter and the second for a relatively longer interval of time, substantially as described.

10. In a sheet-feeding machine, the combination with mechanism adapted to engage the front end of a sheet and feed the same forward, of extensible picker mechanism adapted to engage the rear end of the sheet, a vacuum-tube connected with said extensible picker mechanism, valves controlling said vacuum-tube, mechanism adapted to automatically open and close said valves twice before the sheet-forwarding mechanism begins to forward the sheet, the first of said openings of said valves being for a shorter and the second for a relatively longer interval of time, and blowers adapted to blow a current of air forward under the lifted sheet, substantially as described.

11. The combination with a longitudinally-movable bar, and mechanism adapted to reciprocate the same, of a guide removably mounted thereon adapted to engage the side edge of a sheet of paper, and having one or more openings, a vacuum-tube connected with said guide and with said openings, valves controlling said vacuum-tube, and mechanism adapted to automatically open and close said valves as said bar reciprocates, substantially as described.

12. In a sheet-feeding machine, the combination with a longitudinally-movable bar, and mechanism adapted to reciprocate the same, of a guide removably mounted on said bar adapted to permit the passage of a sheet between it and said bar and to engage the side edge of said sheet, and having one or more openings, a vacuum-tube connected with said guide and with said openings, valves controlling said vacuum-tube, and mechanism adapted to automatically open and close said valves as said bar reciprocates, substantially as described.

13. In a sheet-feeding machine, the combination with a longitudinally-movable bar, mechanism adapted to reciprocate the same, a guide removably secured thereto adapted to engage the side edge of a sheet of paper and having one or more openings, a vacuum-tube connected with said guide and with said openings, a valve controlling said vacuum-tube, and mechanism adapted to automatically open and close said valve as said bar reciprocates, of power-shifting mechanism, and mechanism connected with said valve and with said power-shifting mechanism and adapted to automatically operate said power-shifting mechanism in case no sheet of paper is opposite the openings of said guide when said valve is open, substantially as described.

14. In a sheet-feeding machine, the combination with a longitudinally-movable bar, mechanism adapted to reciprocate the same, a guide removably secured thereto adapted to engage the side edge of a sheet of paper and having one or more openings, a vacuum-tube connected with said guide and with said openings, a valve controlling said vacuum-tube, and mechanism adapted to automatically open and close said valve as said bar reciprocates, of power-shifting mechanism, mechanism connected with said valve and with said power-shifting mechanism and adapted to automatically operate said power-shifting mechanism in case no sheet of paper is opposite the openings of said guide when said valve is open, a brake, and mechanism connecting said brake with said valve and adapted to be thrown into operation and brake the machine in case no sheet of paper is opposite the openings of said guide when said valve is open, substantially as described.

15. In a sheet-feeding machine, the combination with a longitudinally-movable bar, mechanism adapted to reciprocate the same, a guide removably secured thereto adapted to engage the side edge of a sheet of paper and having one or more openings, a vacuum-tube connected with said guide and with said openings, a valve controlling said vacuum-tube, and mechanism adapted to automatically open and close said valve as said bar reciprocates, of power-shifting mechanism, mechanism connected with said valve and with said power-shifting mechanism and adapted to automatically operate said power-shifting mechanism in case no sheet of paper is opposite the openings of said guide when said valve is open, a brake, and mechanism connecting said brake with said power-shifting mechanism and adapted to be operated by said power-shifting mechanism and to brake the machine after the power is shut off, in case no sheet of paper is opposite the openings of said guide when said valve is open, substantially as described.

16. The combination with a longitudinally-movable bar, mechanism adapted to reciprocate the same, and an adjustable shoulder adapted to contact said bar and limit its longitudinal movement, of a guide removably secured to said bar adapted to engage the side edge of a sheet of paper and having one or more openings, a vacuum-tube connected with said guide and with said openings, a valve controlling said vacuum-tube, and mechanism adapted to open and close said valve as said bar reciprocates, substantially as described.

17. In a sheet-feeding machine, the combination with a longitudinally-movable bar, mechanism adapted to positively move said bar longitudinally in one direction, a spring engaging said bar and adapted to return said bar to its first position, and an adjustable shoulder adapted to contact said bar and limit its spring return movement, of a guide removably secured to said bar adapted to engage the side edge of a sheet of paper and provided with openings, a vacuum-tube connected with said guide and with said openings, a valve controlling said vacuum-tube, and mechanism adapted to open said valve at the moment that the spring return movement of said bar begins and to close the same at the end of said spring return movement, substantially as described.

18. In a sheet-feeding machine, the combination with sheet-forwarding devices, guides adapted to contact and aline the lead edge of a sheet, a tube open at one end, a valve connected with said tube, a vacuum-chamber connected with said valve, mechanism adapted to automatically open and close said valve, and mechanism placed in alinement with said guides and adapted to automatically close the open end of said tube upon being contacted by the lead edge of the sheet, of power-shifting mechanism connected with said valve and adapted to be thrown into operation and shut off the power in case the open end of said tube is not closed when said valve is open, substantially as described.

19. In a sheet-feeding machine, the combination with sheet-forwarding devices, guides adapted to receive a sheet from said sheet-forwarding devices and aline the same, of a longitudinally and vertically adjustable tube open at one end, means for longitudinally and vertically adjusting said tube, a valve connected with said tube, a vacuum-chamber connected with said valve, mechanism adapted to automatically open and close said valve, and mechanism placed in alinement with said guides and adapted to automatically close the open end of said tube upon being contacted by the lead edge of the sheet, of power-shifting mechanism connected with said valve and adapted to be thrown into operation and shut off the power in case the open end of said tube is not closed when said valve is open, substantially as described.

20. In a sheet-feeding machine, the combination with sheet-forwarding devices, guides adapted to receive and aline the forwarded sheet, a tube open at one end, a valve connected with said tube, a vacuum-chamber connected with said valve, and mechanism adapted to automatically open and close said valve, of a lever carried by said tube, having one arm provided with a cap adapted to close the open end of said tube, and having the other arm close to said guides and adapted to be contacted by the leading edge of a sheet so as to swing said lever and close said tube by said cap when the lead edge of the sheet is in alinement with said guides, and power-shifting mechanism adapted to be thrown into operation and to shut off the power in case said lever is not contacted by the lead edge of said sheet when said valve is open, substantially as described.

GEORGE F. LEIGER.

Witnesses:
C. E. PICKARD,
JOHN L. JACKSON.